United States Patent
Umezu

(10) Patent No.: US 10,250,862 B2
(45) Date of Patent: Apr. 2, 2019

(54) VIDEO PROCESSING DEVICE

(71) Applicant: Onkyo Corporation, Osaka (JP)

(72) Inventor: Takamasa Umezu, Osaka (JP)

(73) Assignee: ONKYO CORPORATION, Osaka (JP)

(*) Notice: Subject to any disclaimer, the term of this patent is extended or adjusted under 35 U.S.C. 154(b) by 0 days.

(21) Appl. No.: 15/696,643

(22) Filed: Sep. 6, 2017

(65) Prior Publication Data

US 2018/0077396 A1 Mar. 15, 2018

(30) Foreign Application Priority Data

Sep. 12, 2016 (JP) .................................. 2016-177221

(51) Int. Cl.
| | |
|---|---|
| H04N 9/70 | (2006.01) |
| H04N 9/68 | (2006.01) |
| H04N 9/64 | (2006.01) |
| G09G 5/00 | (2006.01) |
| G09G 5/10 | (2006.01) |
| H04N 9/80 | (2006.01) |

(52) U.S. Cl.
CPC ............... *H04N 9/68* (2013.01); *G09G 5/005* (2013.01); *G09G 5/10* (2013.01); *H04N 9/646* (2013.01); *G09G 2320/0276* (2013.01); *G09G 2320/0606* (2013.01); *G09G 2320/0693* (2013.01); *G09G 2360/16* (2013.01); *G09G 2370/04* (2013.01)

(58) Field of Classification Search
USPC .................................................. 386/300, 248
See application file for complete search history.

(56) References Cited

U.S. PATENT DOCUMENTS

| | | | |
|---|---|---|---|
| 2006/0227064 A1 | 10/2006 | Tamano et al. | |
| 2007/0098355 A1 | 5/2007 | Kim | |
| 2012/0001913 A1 | 1/2012 | Lee | |
| 2012/0075435 A1* | 3/2012 | Hovanky | H04N 13/20 348/51 |
| 2012/0256943 A1 | 10/2012 | Atkins et al. | |
| 2013/0016119 A1 | 1/2013 | Ukawa | |
| 2014/0210847 A1* | 7/2014 | Knibbeler | G09G 5/006 345/589 |

(Continued)

FOREIGN PATENT DOCUMENTS

| | | |
|---|---|---|
| EP | 2518719 A2 | 10/2012 |
| WO | 2015198553 A1 | 12/2015 |

*Primary Examiner* — Nigar Chowdhury
(74) *Attorney, Agent, or Firm* — Renner, Otto, Boisselle & Sklar, LLP

(57) ABSTRACT

To prevent gradation collapse. A BD player 1 includes a CPU 2 that obtains dynamic range of a monitor, a reproduction section 4 that obtains content information, and a video processor 5 that converts a digital video signal based on dynamic range of the monitor that is obtained by the CPU 2 and the content information that is obtained by the reproduction section 4. The video processor 5 converts each code value of the digital video signal of a content so that code value of the digital video signal that corresponds to "minimum luminance of the content" becomes code value that corresponds to "minimum luminance of the monitor" and code value of the digital video signal that corresponds to "maximum luminance of the content" becomes code value that corresponds to "maximum luminance of the monitor".

10 Claims, 13 Drawing Sheets

(56) References Cited

U.S. PATENT DOCUMENTS

| | | | |
|---|---|---|---|
| 2014/0341272 A1* | 11/2014 | Miller | H04N 5/202 |
| | | | 375/240.02 |
| 2014/0363093 A1* | 12/2014 | Miller | G06F 3/14 |
| | | | 382/235 |
| 2016/0205338 A1* | 7/2016 | Kozuka | H04N 5/20 |
| | | | 348/687 |
| 2017/0025074 A1* | 1/2017 | Farrell | G06K 9/00711 |
| 2017/0105042 A1 | 4/2017 | Toma et al. | |
| 2017/0180759 A1* | 6/2017 | Mertens | H04N 19/98 |
| 2017/0251161 A1* | 8/2017 | Toma | H04N 5/57 |
| 2017/0256039 A1* | 9/2017 | Hsu | G06T 5/009 |
| 2017/0347113 A1* | 11/2017 | De Haan | H04N 1/64 |

* cited by examiner

VIDEO PROCESSING DEVICE

BACKGROUND OF THE INVENTION

1. Field of the Invention

The present invention relates to a video processing device that performs video signal processing to a digital video signal.

2. Description of the Related Art

In recent years, HDR contents that are supported by HDR (High Dynamic Range) of high luminance appear. The HDR contents are mastered by using a master monitor. The HDR contents are sent from source equipment and repeater equipment that are supported by HDR to a monitor and a projector via HDMI (registered trademark) or the like. The following content information is sent with a video signal.
(1) Type of EOTF (Electro-Optical Transfer Function)
(2) Maximum luminance of a mastering monitor
(3) Minimum luminance of the mastering monitor
(4) Maximum frame average luminance The monitor converts the video signal into optical brightness based on information of (1) to (4). However, there are cases where dynamic range of the content exceeds dynamic range of the monitor depending on the content because dynamic range is narrower than the mastering monitor in the monitor that is sold in the market. In this case, luminance conversion is only performed based on each EOTF standard and black crush and halation occur. To reduce black crush and halation, it is necessary that the monitor uses content information and performs optimum luminance conversion based on dynamic range of the content. However, depending on the monitor, it decides processing uniquely based on type of EOTF and gradation collapse occurs depending on the content.

Patterns of dynamic range of the monitor are illustrated, and gradation collapse is described below using a graph of EOTF. With respect to breadth of dynamic range, 3 patterns of the following (a) to (c) are thought.
(a) Standard value>the master monitor>the content>the general monitor
(b) Standard value>the master monitor>the general monitor>the content
(c) Standard value>the content>the master monitor>the general monitor Normally, (a) is suitable and (a) is described as an example.

FIG. 8 is a diagram illustrating standard value of dynamic range. FIG. 9 is a diagram illustrating an example of dynamic range of the master monitor. FIG. 10 is a diagram illustrating an example of range of luminance signal that is included in the content. FIG. 11 is a diagram illustrating an example of dynamic range of a general monitor. As illustrated in FIG. 8 to FIG. 11, FIG. 8 to FIG. 11 match the above mentioned (a).

The monitor that decides processing uniquely based on type of EOTF performs to apply formula of EOTF as processing example. For this reason, in outside of dynamic range of the monitor, value sticks maximum value or minimum value. Thus, it is highly possible that black crush and halation occur. FIG. 12 is a diagram illustrating case where dynamic range of monitor is 0.05-700 ($cd/m^2$). FIG. 13 is an enlarged diagram illustrating neighborhood of black crush. As illustrated in diagrams, value sticks the minimum value and black crush occurs. Further, value sticks the maximum value and halation occurs. Herein, the value of a video signal illustrated in FIG. 8 to FIG. 13 is a value in 10 bits signal.

Invention described in JP 5914802 B converts an HDR signal into a linear signal indicating luminance value. And, the invention described in JP 5914802 B converts the converted linear signal using display characteristics information and content luminance information.

The above described gradation collapse is caused by dynamic range shortage of the monitor.

SUMMARY OF THE INVENTION

An objective of the present invention is to prevent gradation collapse.

A video processing device of the present invention comprising: a controller that obtains dynamic range of a display device; an obtaining section that obtains content information; and a video processor that converts a video signal based on the dynamic range of the display device that is obtained by the controller and the content information that is obtained by the obtaining section; wherein the video processor converts the video signal so that minimum luminance of content that is included in the content information becomes minimum luminance of the dynamic range of the display device and maximum luminance of the content that is included in the content information becomes maximum luminance of the dynamic range of the display device.

In the present invention, the video processor converts a video signal so that minimum luminance of a content becomes minimum luminance of a display device and maximum luminance of the content becomes maximum luminance of the display device. Thus, black crush and halation do not occur because luminance of the content is suppressed within luminance of the display device. Therefore, according to the present invention, gradation collapse is prevented.

Preferably, wherein the controller makes the video processor generate a test image, fixes EOTF of the content information to EOTF that is supported by the display section, sends multiple pieces of the content information that are different from each other in other than EOTF with the test image to the display device in turn, and receives setting whether optimization of dynamic range of the content is performed or not, the video processor converts the video signal when the controller receives setting that optimization of the dynamic range of the content is performed, and the video processor does not convert the video signal when the controller receives setting that optimization of dynamic range of the content is not performed.

In the present invention, a controller fixes EOTF of the content information to EOTF that is supported by the display device and sends multiple pieces of content information different from each other in other than EOTF with a test image to the display device in turn. When luminance and gradation of the display device do not change, the display device decides processing based on type of EOTF uniquely. Herein, the controller receives setting whether optimization of dynamic range of the content is performed or not. Therefore, when luminance and gradation of the display device do not change, a user performs setting that optimization of dynamic range of the content is performed and can make the video processing device perform optimization of dynamic range of the content.

Preferably, wherein the controller makes the video processor generate a ramp image or a gray scale image, sends the ramp image or the gray scale image to the display device, receives setting of maximum value and minimum value of the ramp image or the gray scale image, and obtains maximum value and minimum value of the ramp image or the gray scale image of which setting is received as the dynamic range of the display device.

Preferably, wherein the controller makes the video processor generate multiple ramp images or gray scale images that are different from each other in maximum value and minimum value, sends multiple ramp images or gray scale images to the display device in turn, receives selection of any one of multiple ramp images or gray scale images, and obtains the maximum value and the minimum value of ramp image or gray scale image of which selection is received as the dynamic range of the display device.

Preferably, wherein the obtaining section obtains the content information from media.

Preferably, wherein the obtaining section obtains the content information from the video signal that is received.

According to the present invention, gradation collapse is prevented.

DETAILED DESCRIPTION OF THE PREFERRED EMBODIMENTS

An embodiment of the present invention is described below.

(First Embodiment)

Figure 1:
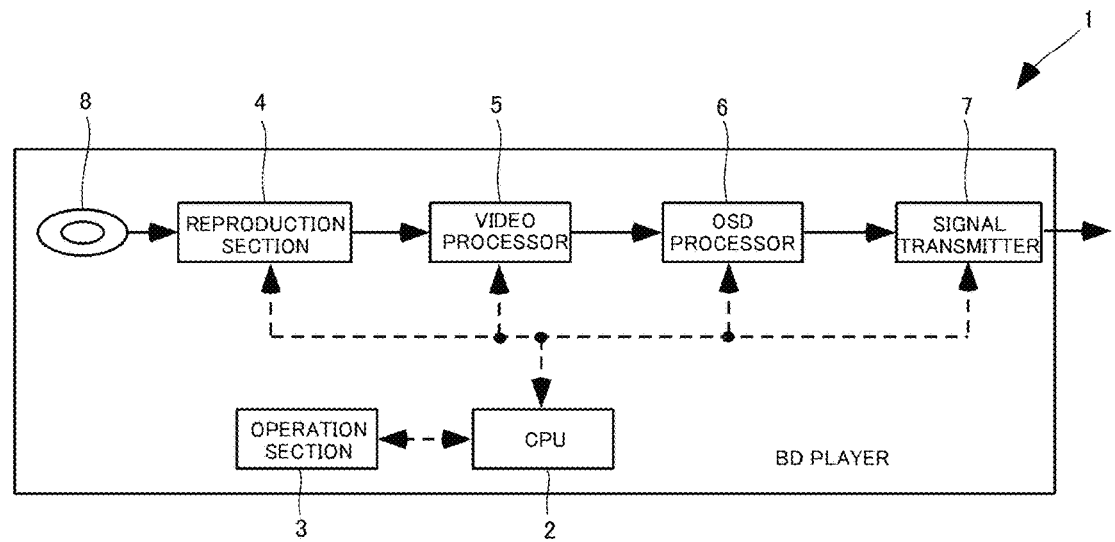
FIG. 1 is a block diagram illustrating a constitution of a BD player according to a first embodiment of the present invention.

FIG. 1 is a block diagram illustrating a constitution of a BD (Blu-ray (registered trademark) Disc) player according to a first embodiment of the present invention. The BD player 1 (video processing device) includes a CPU 2, an operation section 3, a reproduction section 4, a video processor 5, a OSD processor 6, and a signal transmitter 7. The CPU (Central Processing Unit) 2 (controller) controls respective sections composing the BD player 1. The operation section 3 is for receiving user operation, such as operation buttons that are provided at an enclosure of the BD player 1 and a remote controller. The reproduction section 4 reads from a BD 8 (media) and reproduces a digital video signal, for example. The reproduction section 4 obtains content information from the BD 8 when reproducing. Type of EOTF, maximum luminance of a mastering monitor, minimum luminance of a mastering monitor, maximum luminance of a content, and maximum frame average luminance are included in the content information. The video processor 5 performs video signal processing to the digital video signal that is reproduced by the reproduction section 4. Processing to convert dynamic range of the content is included in the video signal processing. Further, the video processor 5 generates a ramp image and a gray scale image. The ramp image has smooth gradation change.

The OSD (On Screen Display) processor 6 generates an OSD. The signal transmitter 7 embeds the content information into the digital video signal and sends it to a monitor (display device) that is connected.

Processing to perform optimization of dynamic range of the content is described below. The CPU 2 judges whether the monitor that is connected decides processing based on type of EOTF uniquely. The CPU 2 outputs a test image (for example, the ramp image or the gray scale image) and the content information. Type of EOTF, maximum luminance of a mastering monitor, minimum luminance of a mastering monitor, maximum luminance of a content, and maximum frame average luminance are included in the content information. Concretely, the CPU 2 makes the video processor 5 generate the ramp image, for example. Further, the CPU 2 makes the video processor 5 embed the content information into the ramp image and send it to the monitor. Herein, the CPU 2 stores combinations in which the other values of the content information are changed against each EOTF. And, the CPU 2 fixes EOTF of the content information to EOTF that is supported by the monitor and outputs multiple pieces of content information that are different from each other in other than EOTF and the ramp image to the monitor in turn. A user looks at the monitor and confirms whether luminance and gradation of the monitor changes or not. Instead of the ramp image, the gray scale images may be generated and the gray scale image may be sent.

When luminance and gradation do not change, the monitor decides processing based on type of EOTF uniquely. For this reason, the user operates the operation section 3 and makes the BD player 1 perform optimization of dynamic range of the content. Further, when luminance and gradation of the monitor change, it is not necessary to perform optimization of dynamic range of the content in the BD player 1 because the monitor performs luminance adjustment based on the content information other than EOTF and type of EOTF. Therefore, when CPU 2 receives setting that optimization of dynamic range of the content is not performed via the operation section 3, it does not perform optimization of dynamic range of the content (conversion of the digital video signal).

When the CPU 2 receives setting that optimization of dynamic range of the content is performed via the operation section 3, it performs optimization of dynamic range of the content (conversion of the digital video signal). First, the CPU 2 obtains dynamic range of the monitor that is connected. The CPU 2 sends type of EOTF and the ramp image by the signal transmitter 7 to the monitor to obtain dynamic range of the monitor that is connected. Herein, the BD player 1 has manual adjustment mode and preset mode.

The manual adjustment mode is mode that the user can adjust maximum value and minimum value of the ramp image by operating the operation section 3. The user adjusts maximum value and minimum value of the ramp image by operating the operation section 3 and adjusts them to a value at which gradation can be identified the best. The CPU 2 changes gradation of the ramp image based on user operation by the video processor 5. The CPU 2 receives setting of maximum value and minimum value of the ramp image via the operation section 3. And, the CPU 2 sets maximum value and minimum value of which settings are received to maximum luminance value and minimum luminance value of the monitor against each EOTF. Namely, the CPU 2 obtains maximum value and minimum value of the ramp image of which settings are received as dynamic range of the monitor. In other words, the CPU 2 assumes maximum value and minimum value of the ramp image of which settings are received as dynamic range of the monitor.

Preset mode is mode that sends several ramp images matching patterns of dynamic range of the general monitor to monitor and the user selects the ramp image of which gradation can be identified the best among the ramp images that are displayed on the monitor. The CPU 2 makes the video processor 5 generate multiple ramp images that are different in maximum value and minimum value. The CPU 2 sends multiple ramp images to the monitor by the signal transmitter 7 in turn. The user selects the ramp image of which gradation can be identified the best via the operation section 3. The CPU 2 receives, via the operation section 3, selection of any one of multiple ramp images. And, the CPU 2 sets maximum value and minimum value of the ramp image of which selection is received to maximum luminance value and minimum luminance value of the monitor against each EOTF. Namely, the CPU 2 obtains maximum value and minimum value of the ramp image of which selection is received as dynamic range of the monitor. In other words, the CPU 2 assumes maximum value and minimum value of the ramp image of which selection is received as dynamic range of the monitor.

The CPU 2 makes the reproduction section (obtaining section) 4 obtain the content information from the BD 8. Next, the CPU 2 makes the video processor 5 compress or expand dynamic range of the digital video signal based on dynamic range of the monitor that is obtained. First, the video processor 5 sets "minimum luminance of a mastering monitor" to "minimum luminance of the content". Next, the video processor 5 converts each code value of the digital video signal of the contents so that code value of the digital video signal that corresponds to "minimum luminance of the content" becomes code value that corresponds to "minimum luminance of the monitor" and code value of the digital video signal that corresponds to "maximum luminance of the content" becomes code value that corresponds to "maximum luminance of the monitor".

Code value is defined as the following.
Code value of the digital video signal before conversion D
Code value of the digital video signal after conversion D'
Code value of the digital video signal that corresponds to minimum luminance of the content Cmin
Code value of the digital video signal that corresponds to maximum luminance of the content Cmax
Code value that corresponds to minimum luminance of the monitor Mmim
Code value that corresponds to maximum luminance of the monitor Mmax In case of maximum luminance of the content=0 and maximum luminance of the content>maximum luminance of the mastering monitor, "maximum luminance of the mastering monitor" is used instead of "maximum luminance of the content".

Figure 2:
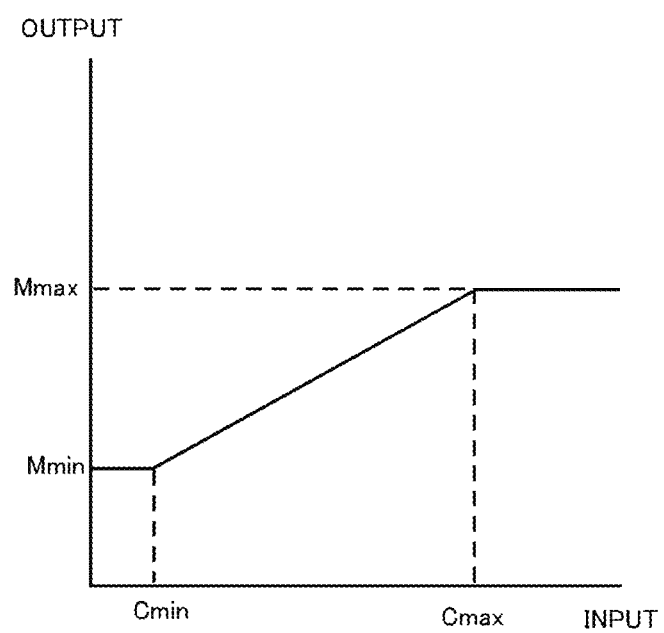
FIG. 2 is a graph illustrating conversion formula.

Conversion formula is as the following. FIG. 2 is a graph illustrating the conversion formula.
When of D<Cmin, D'=Mmin
When of Cmin≤D≤Cmax, $$D'=(D-Cmin)/(Cmax-Cmin)\times(Mmax-Mmin)+Mmin$$

When of D>Cmax, D'=Mmax
The content information is as the following.
Type of EOTF SMPTE ST2084
Maximum luminance of the mastering monitor 4000 cd/m$^2$
Minimum luminance of the mastering monitor 0.0050 cd/m$^2$ (code value 19)
Maximum luminance 1977 cd/m$^2$ (code value 842)
Maximum frame average luminance 1112 cd/m$^2$ As a result that the user adjusts the ramp image, it is assumed that minimum luminance and maximum luminance of the monitor are as the following.
Minimum luminance of the monitor 0.05 cd/m$^2$ (code value 51)
Maximum luminance of the monitor 700 cd/m$^2$ (code value 728)

Figure 3:
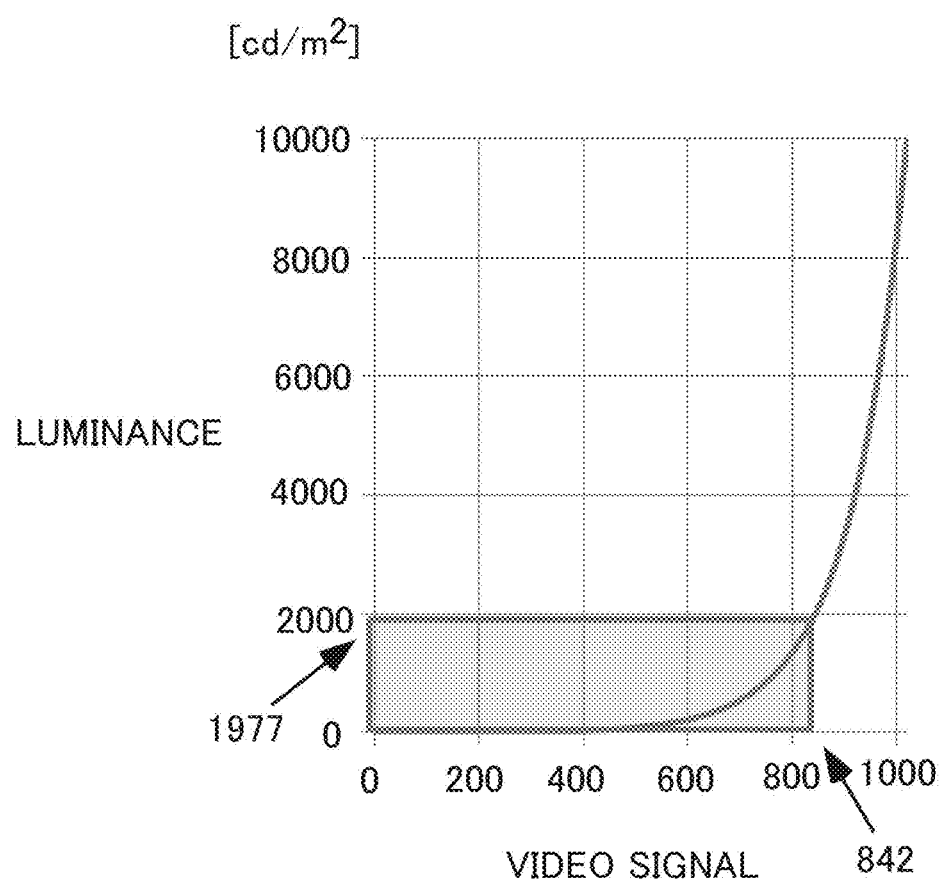
FIG. 3 is a diagram illustrating an example of range of a luminance signal included in a content.
Figure 4:
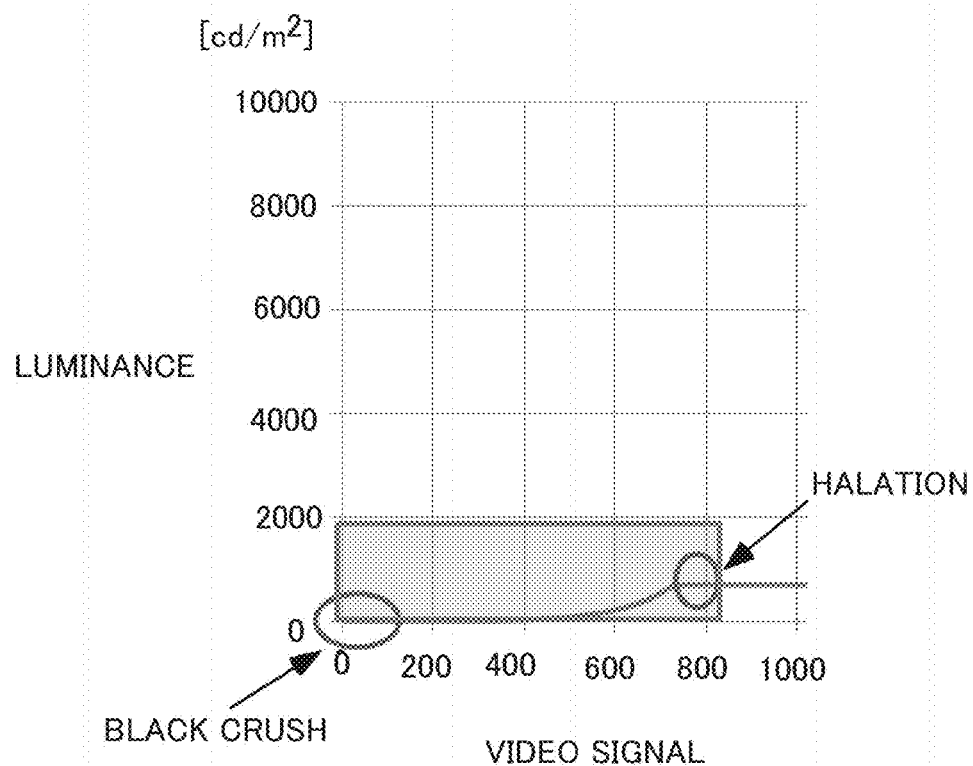
FIG. 4 is a diagram illustrating example in which black crush and halation occur.

FIG. 3 is a diagram illustrating an example of range of the luminance signal that is included in the content. When the BD player 1 does not convert the digital video signal and outputs the digital video signal to the monitor, black crush and halation occur as illustrated in FIG. 4, for example.

The video processor 5 performs the above described calculation so as to convert code value of the digital video signal.
Minimum signal of the contents 0.0050 cd/m$^2$ 19 (before conversion)->51 (after conversion)
Maximum signal of the contents 1977 cd/m$^2$ 842 (before conversion)->728 (after conversion)

Figure 5:
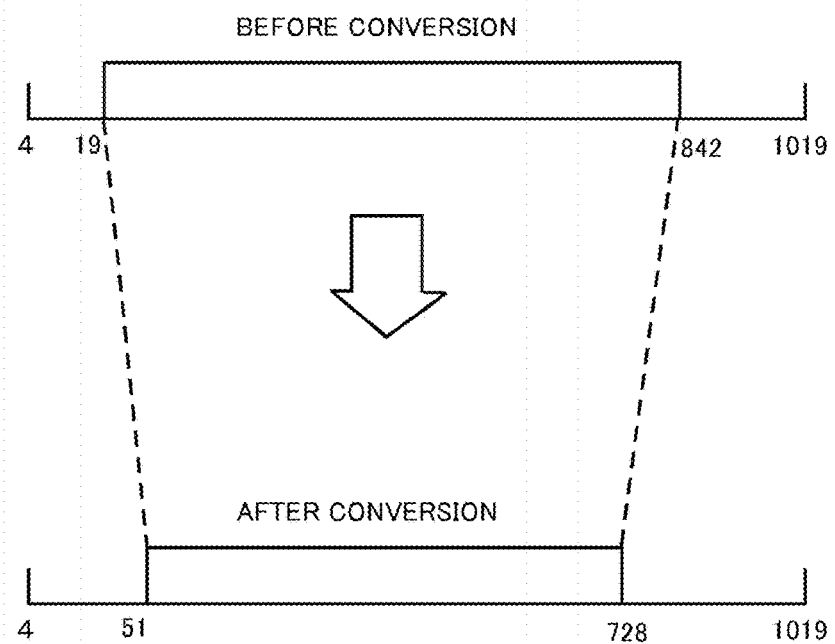
FIG. 5 is a diagram illustrating luminance range of a converted digital video signal.
Figure 6:
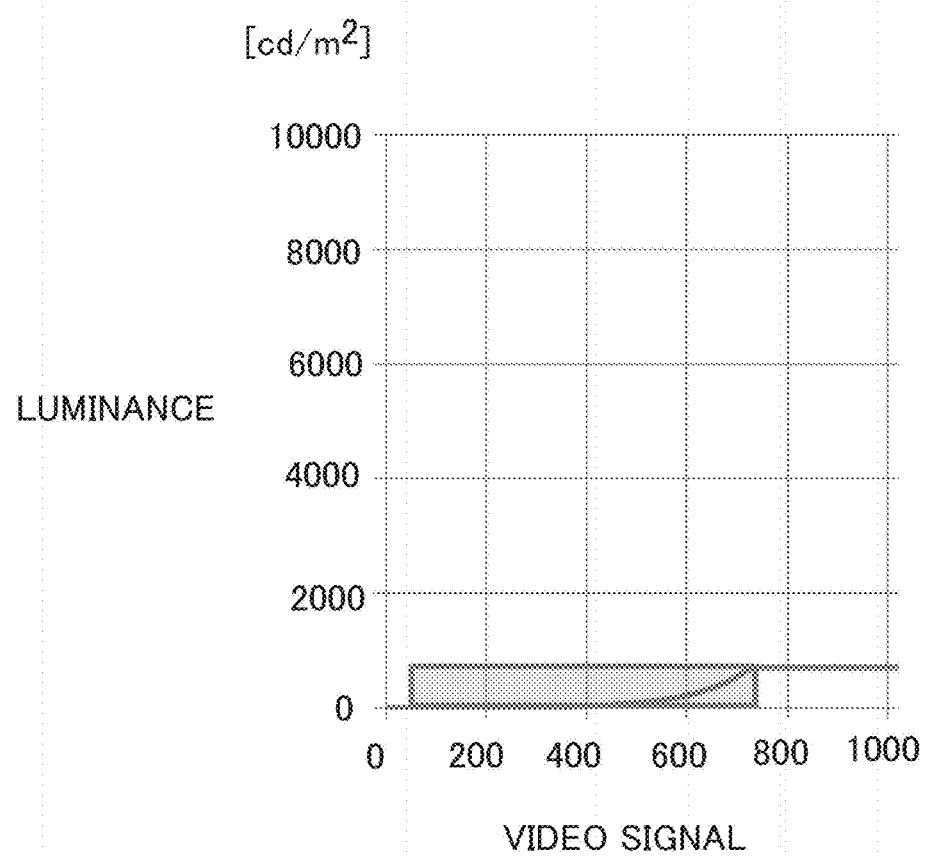
FIG. 6 is a diagram illustrating luminance range of a converted digital video signal.

FIG. 5 is a diagram illustrating luminance range of the converted digital video signal. Occurring of black crush and halation is prevented as illustrated in FIG. 6 because the converted digital video signal is sent to the monitor. Herein, value of the video signal of FIG. 3 to FIG. 6 is the value in 10 bits signal. In current standard, 10 bits and 12 bits are defined. Value of the video signal according to the present embodiment is not limited to the value in 10 bits and 12 bits.

Conversion as the following may be performed because change of gradation is different depending on the image in conversion of code value of the digital video signal.
(1) After converting Mmin≤D'≤Mmax, gamma conversion is performed further.
(2) After converting Mmin≤D'≤Mmax, conversion using sigmoid function is performed further.
(3) Area from Mmin to Mmax is divided to several areas and slope of conversion formula of each area is changed.

The above described conversion formula may be used to prevent occurring of black crush and halation.

Second Embodiment

Figure 7:
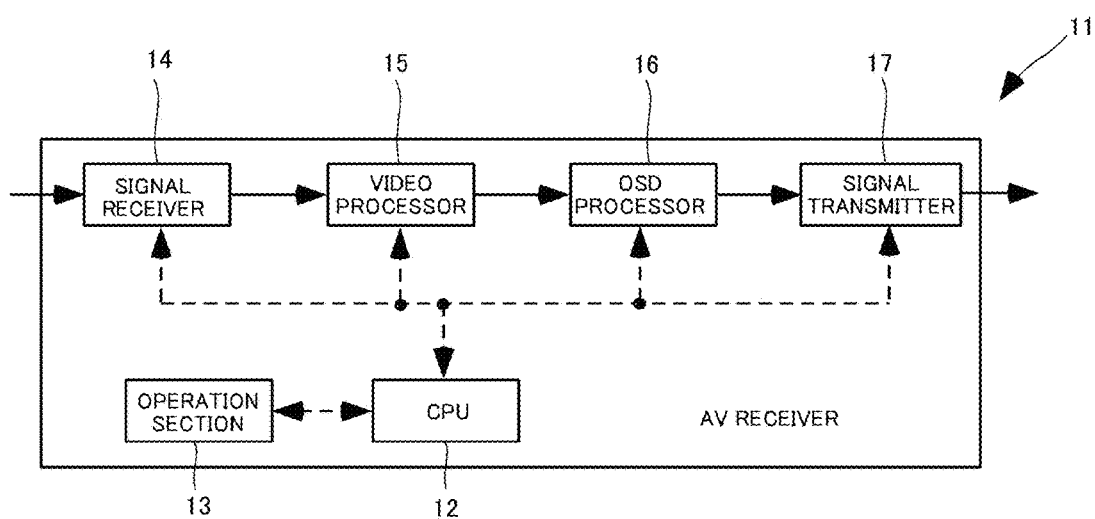
FIG. 7 is a block diagram illustrating a constitution of an AV receiver according to a second embodiment of the present invention.
Figure 8:
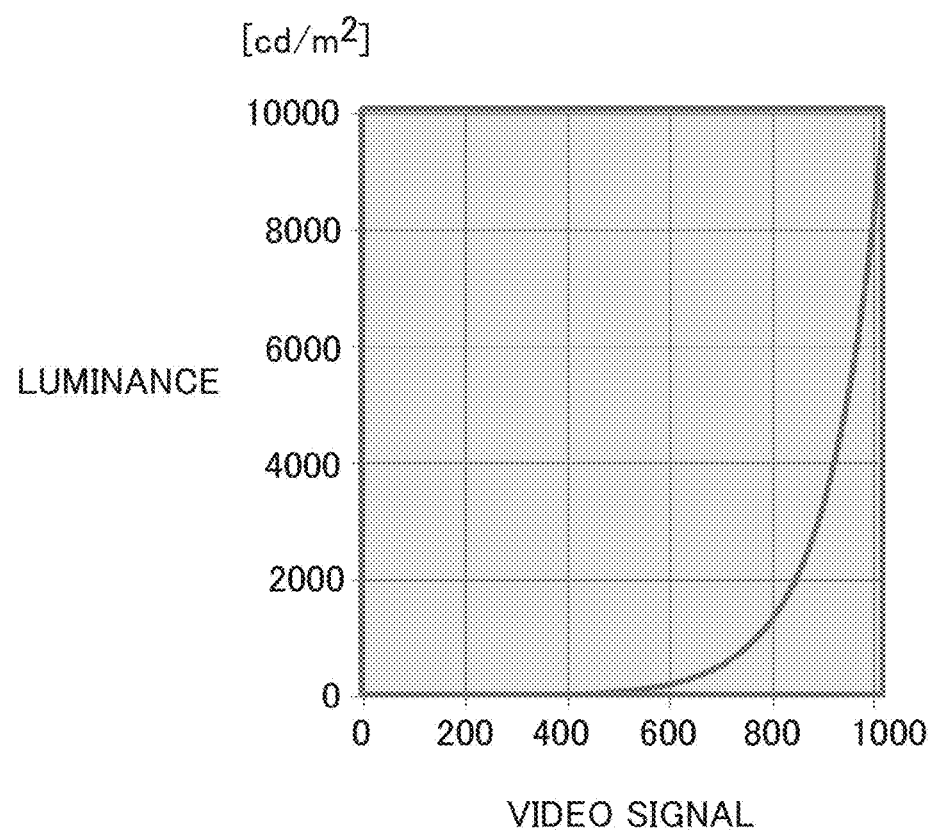
FIG. 8 is a diagram illustrating dynamic range of standard value.
Figure 9:
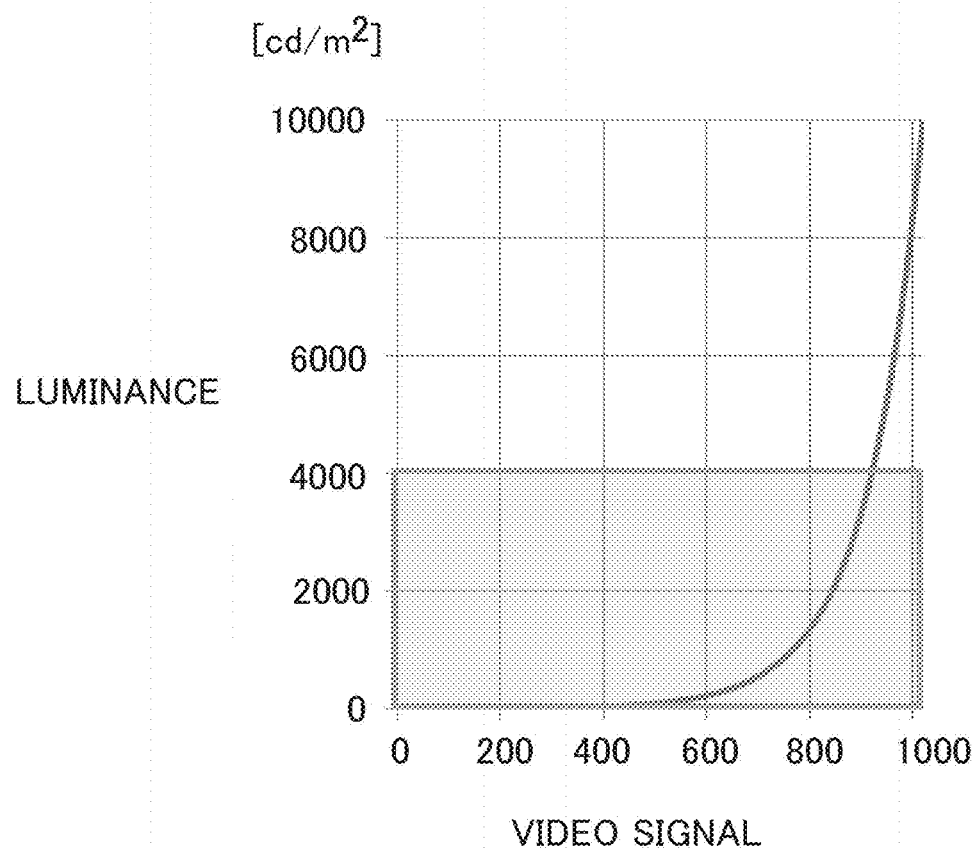
FIG. 9 is a diagram illustrating an example of dynamic range of a master monitor.
Figure 10:
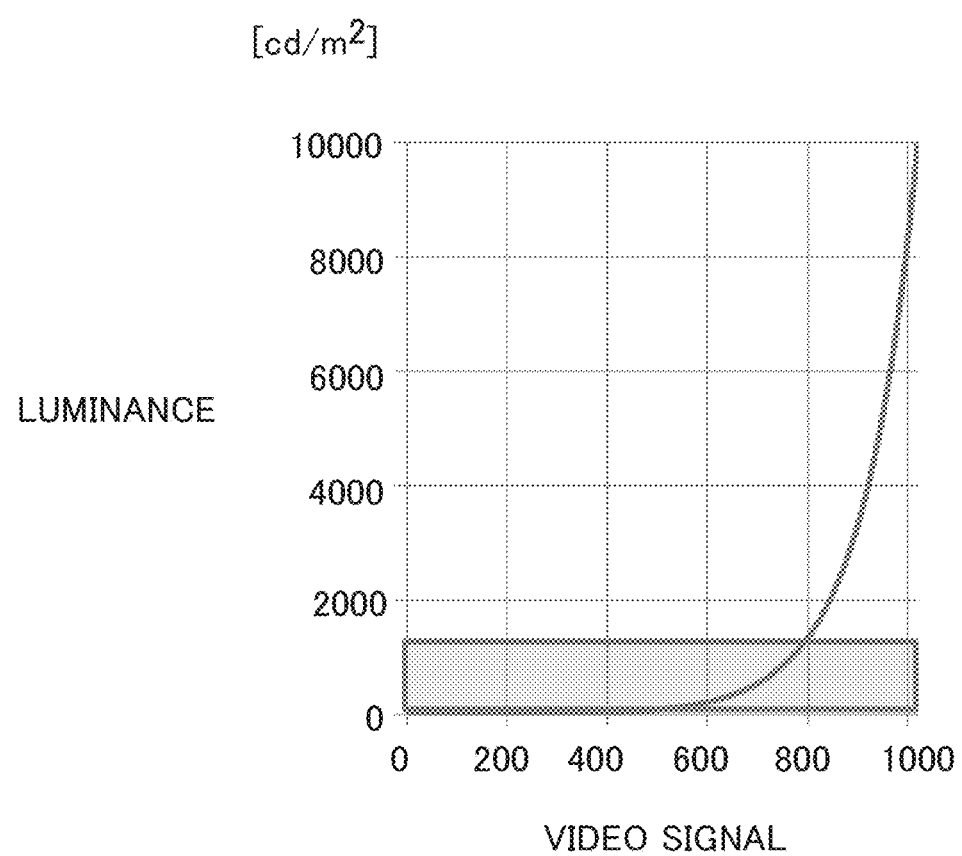
FIG. 10 is a diagram illustrating an example of range of a luminance signal included in a content.
Figure 11:
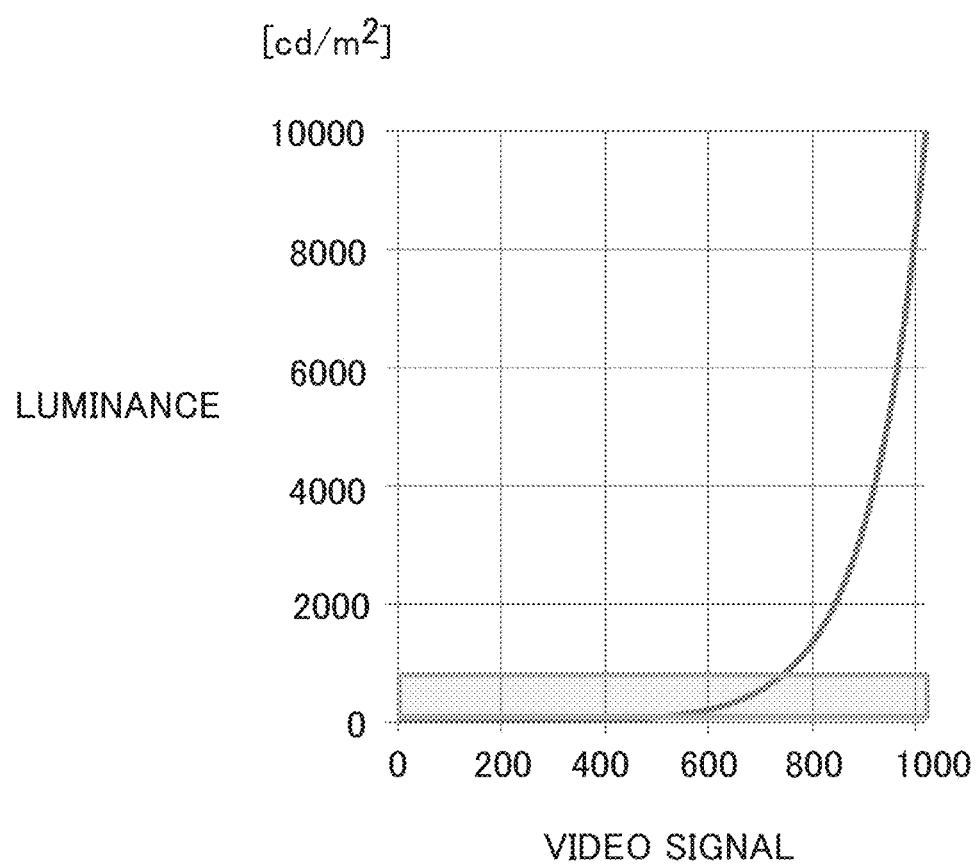
FIG. 11 is a diagram illustrating an example of dynamic range of a general monitor.
Figure 12:
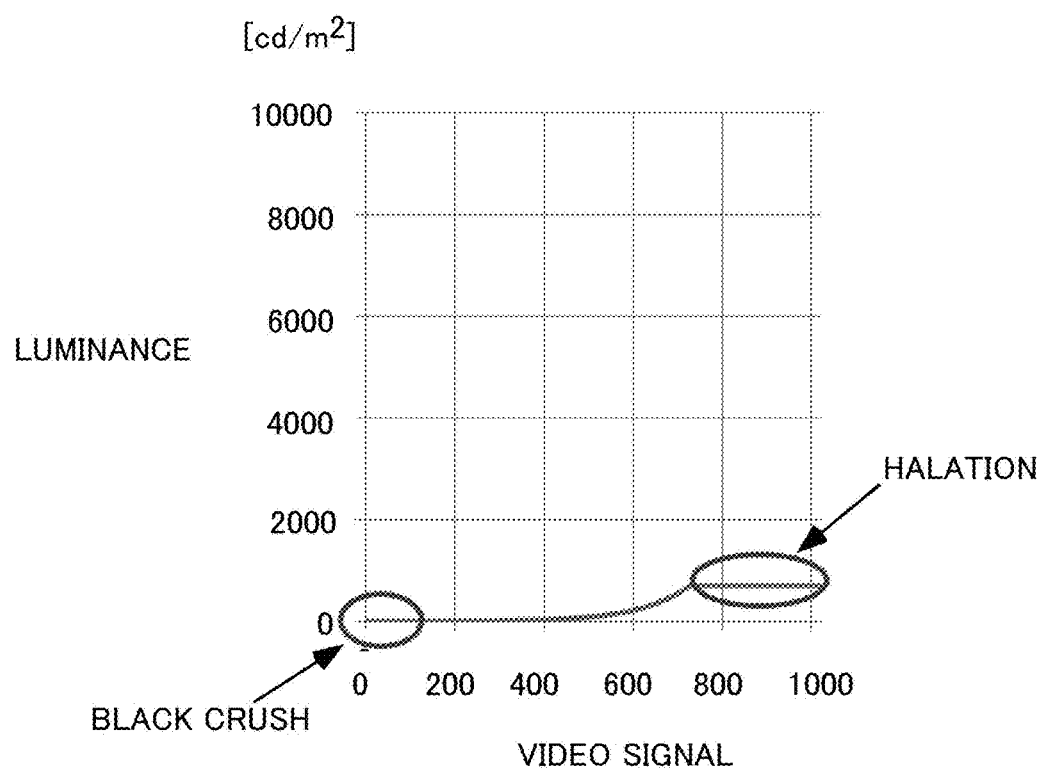
FIG. 12 is a diagram illustrating an example in case where dynamic range of a monitor is 0.05-700 (cd/m$^2$).
Figure 13:
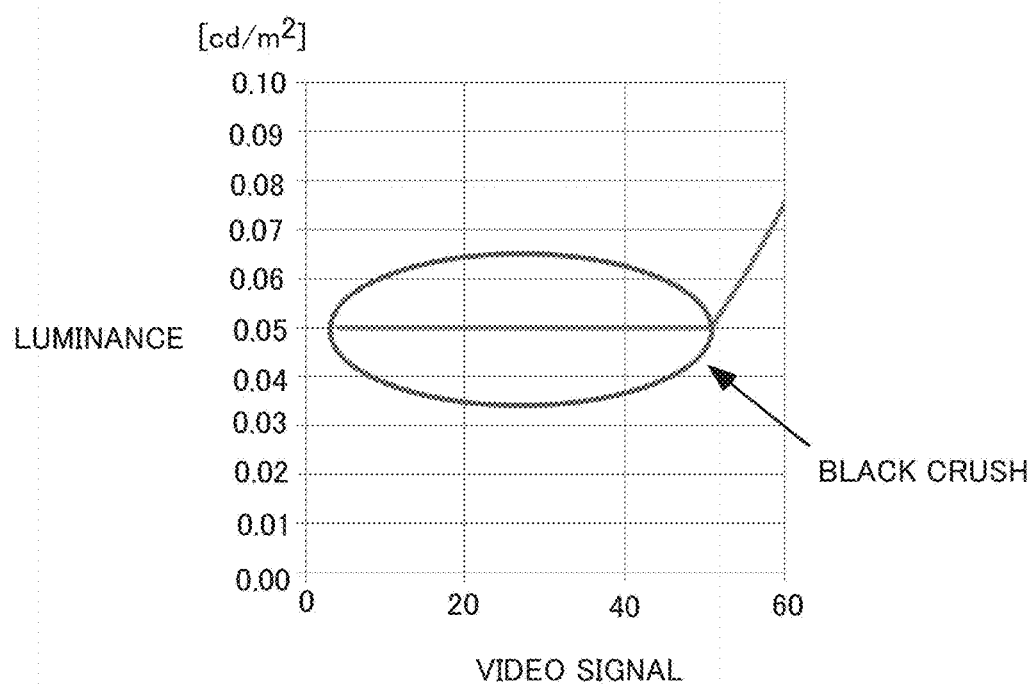
FIG. 13 is an enlarged diagram illustrating neighborhood of black crush.

FIG. 7 is a block diagram illustrating a constitution of an AV receiver according to a second embodiment of the present invention. As illustrated in FIG. 7, the AV receiver 11 (video processing device) includes a CPU 12, an operation section 13, a signal receiver 14, a video processor 15, an OSD processor 16, and a signal transmitter 17. Description is omitted because the CPU 12, the operation section 13, the video processor 15, the OSD processor 16, and the signal transmitter 17 except the signal receiver 14 are the same as the CPU 2, the operation section 3, the video processor 5, the OSD processor 6, and the signal transmitter 7 according to the first embodiment with respect to processing to optimize dynamic range of the content.

A BD player is connected to the AV receiver 11, for example. The signal processor 14 receives the digital video signal that is output from the BD player. The CPU 2 makes the signal receiver 14 (obtaining section) obtain the content information from the digital signal.

As described above, in the present embodiment, the video processors 5 and 15 convert each code value of the digital video signal of the content so that code value of the digital video signal that corresponds to "minimum luminance of the content" becomes code value that corresponds to "minimum luminance of the monitor" and code value of the digital video signal that corresponds to "maximum luminance of the content" becomes code value that corresponds to "maximum luminance of the monitor". Thus, black crush and halation do not occur because luminance of the content is suppressed within luminance of the monitor. Therefore, according to the present embodiment, gradation collapse is prevented.

Further, in the present embodiment, the CPUs 2 and 12 fix EOTF of the content information to EOTF that is supported by the monitor and sends multiple pieces of the content information that are different from each other in other than EOTF with the test image to the monitor in turn. When luminance and gradation of the monitor do not change, the monitor decides processing based on type of EOTF uniquely. Herein, the CPUs 2 and 12 receive setting whether optimization of dynamic range of the content is performed or not. Therefore, when luminance and gradation of the monitor do not change, the user performs setting that optimization of dynamic range of the content is performed and makes the BD player 1 and the AV receiver 11 perform optimization of dynamic range of the content.

The embodiment of the present invention is described above, but the mode to which the present invention is applicable is not limited to the above embodiment and can be suitably varied without departing from the scope of the present invention.

In the above described embodiment, the CPUs 2 and 12 send type of EOTF and the ramp image to the monitor by the signal transmitters 7 and 17 to obtain dynamic range of the monitor that is connected. Instead of the ramp image, the gray scale image may be sent. In this case, in the manual mode, the CPUs 2 and 12 receive setting of maximum value and minimum value of the gray scale image. And, the CPUs 2 and 12 obtain maximum value and minimum value of the gray scale image of which settings are received as dynamic range of the monitor. Further, in the preset mode, the CPUs 2 and 12 receive selection of any one of multiple gray scale images. And, the CPUs 2 and 12 obtain maximum value and minimum value of the gray scale image of which selection is received as dynamic range of the monitor.

In the above described embodiment, the BD player (source equipment) and the AV receiver (repeater equipment) are illustrated as the video processing device. Not limited to this, the other video processing device may be employed.

The present invention can be suitably employed in a video processing device that performs video signal processing to a digital video signal.

What is claimed is:

1. A video processing device comprising:
a controller that obtains dynamic range of a display device;
an obtaining section that obtains content information; and
a video processor that converts a video signal based on the dynamic range of the display device that is obtained by the controller and the content information that is obtained by the obtaining section;
wherein the video processor converts the video signal so that minimum luminance of content that is included in the content information becomes minimum luminance of the dynamic range of the display device and maximum luminance of the content that is included in the content information becomes maximum luminance of the dynamic range of the display device; and
wherein the controller;
makes the video processor generate multiple ramp images or gray scale images that are different from each other in maximum value and minimum value,
sends the multiple ramp images or gray scale images to the display device in turn,
receives selection of any one of the multiple ramp images or gray scale images, and
obtains the maximum value and the minimum value of the ramp image or gray scale image of which selection is received as the dynamic range of the display device.

2. The video processing device according to claim 1,
wherein the controller makes the video processor generate a test image,
fixes EOTF of the content information to EOTF that is supported by the display section,
sends multiple pieces of the content information that are different from each other in other than EOTF with the test image to the display device in turn, and
receives setting whether optimization of dynamic range of the content is performed or not,
the video processor converts the video signal when the controller receives setting that optimization of the dynamic range of the content is performed, and
the video processor does not convert the video signal when the controller receives setting that optimization of dynamic range of the content is not performed.

3. The video processing device according to claim 1,
wherein the controller makes the video processor generate a ramp image or a gray scale image,
sends the ramp image or the gray scale image to the display device,
receives setting of maximum value and minimum value of the ramp image or the gray scale image, and
obtains maximum value and minimum value of the ramp image or the gray scale image of which setting is received as the dynamic range of the display device.

4. The video processing device according to claim 1, wherein the obtaining section obtains the content information from media.

5. The video processing device according to claim 1, wherein the obtaining section obtains the content information from the video signal that is received.

6. The video processing device according to claim 1, wherein the multiple ramp images or gray scale images comprise multiple ramp images.

7. The video processing device according to claim 1, wherein the multiple ramp images or gray scale images comprise multiple gray scale images.

8. A video processing device comprising:
circuitry configured to:
generate multiple ramp images or gray scale images that are different from each other in maximum value and minimum value,
send the multiple ramp images or gray scale images to a display device in turn,
receive selection of any one of the multiple ramp images or gray scale images, and
obtain as a dynamic range of the display device the maximum value and the minimum value of the selected ramp image or gray scale image;

obtain content information;

convert a video signal based on the obtained dynamic range of the display device and the obtained content information; and convert the video signal so that minimum luminance of content that is included in the content information becomes minimum luminance of the dynamic range of the display device and maximum luminance of the content that is included in the content information becomes maximum luminance of the dynamic range of the display device.

9. The video processing device according to claim 8, wherein the multiple ramp images or gray scale images comprise multiple ramp images.

10. The video processing device according to claim 8, wherein the multiple ramp images or gray scale images comprise multiple gray scale images.

* * * * *